US008589484B2

(12) United States Patent
Scoda

(10) Patent No.: US 8,589,484 B2
(45) Date of Patent: *Nov. 19, 2013

(54) METHOD FOR OPTIMIZING A WEB CONTENT PROXY SERVER AND DEVICES THEREOF

(71) Applicant: Usablenet Inc., New York, NY (US)

(72) Inventor: Enrico Scoda, Martignacco (IT)

(73) Assignee: Usablenet Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,346

(22) Filed: Nov. 26, 2012

(65) Prior Publication Data

US 2013/0086157 A1  Apr. 4, 2013

Related U.S. Application Data

(63) Continuation of application No. 12/660,637, filed on Mar. 2, 2010, now Pat. No. 8,321,502.

(51) Int. Cl.
*G06F 15/16* (2006.01)

(52) U.S. Cl.
USPC .......................................... 709/203; 709/205

(58) Field of Classification Search
USPC .......... 709/203, 201, 202, 217–219, 227–229
See application file for complete search history.

(56) References Cited

U.S. PATENT DOCUMENTS

| 7,954,144 B1* | 5/2011 | Ebrahimi et al. ................ 726/12 |
| 2001/0054020 A1 | 12/2001 | Barth et al. |
| 2004/0039822 A1* | 2/2004 | Bensimon ...................... 709/227 |
| 2004/0044768 A1* | 3/2004 | Takahashi ...................... 709/225 |
| 2009/0106349 A1* | 4/2009 | Harris ............................ 709/203 |
| 2010/0071052 A1* | 3/2010 | Mao et al. ........................ 726/12 |

FOREIGN PATENT DOCUMENTS

WO    WO0223375 A2    3/2002

OTHER PUBLICATIONS

International Search Report for European Application No. 11156548.5, May 20, 2011.

* cited by examiner

*Primary Examiner* — Ruolei Zong
(74) *Attorney, Agent, or Firm* — LeClairRyan, a Professional Corporation

(57) ABSTRACT

A method, computer readable medium and apparatus that optimizes a web content proxy server includes obtaining at a proxy server a web page with an original server cookie from one of one or more web content servers in response to a request from one of one or more client devices. A web optimized client cookie based on the original server cookie is generated at the proxy server. The obtained web page with the generated web optimized client cookie is providing by the proxy server to the requesting one of one or more client devices.

21 Claims, 4 Drawing Sheets

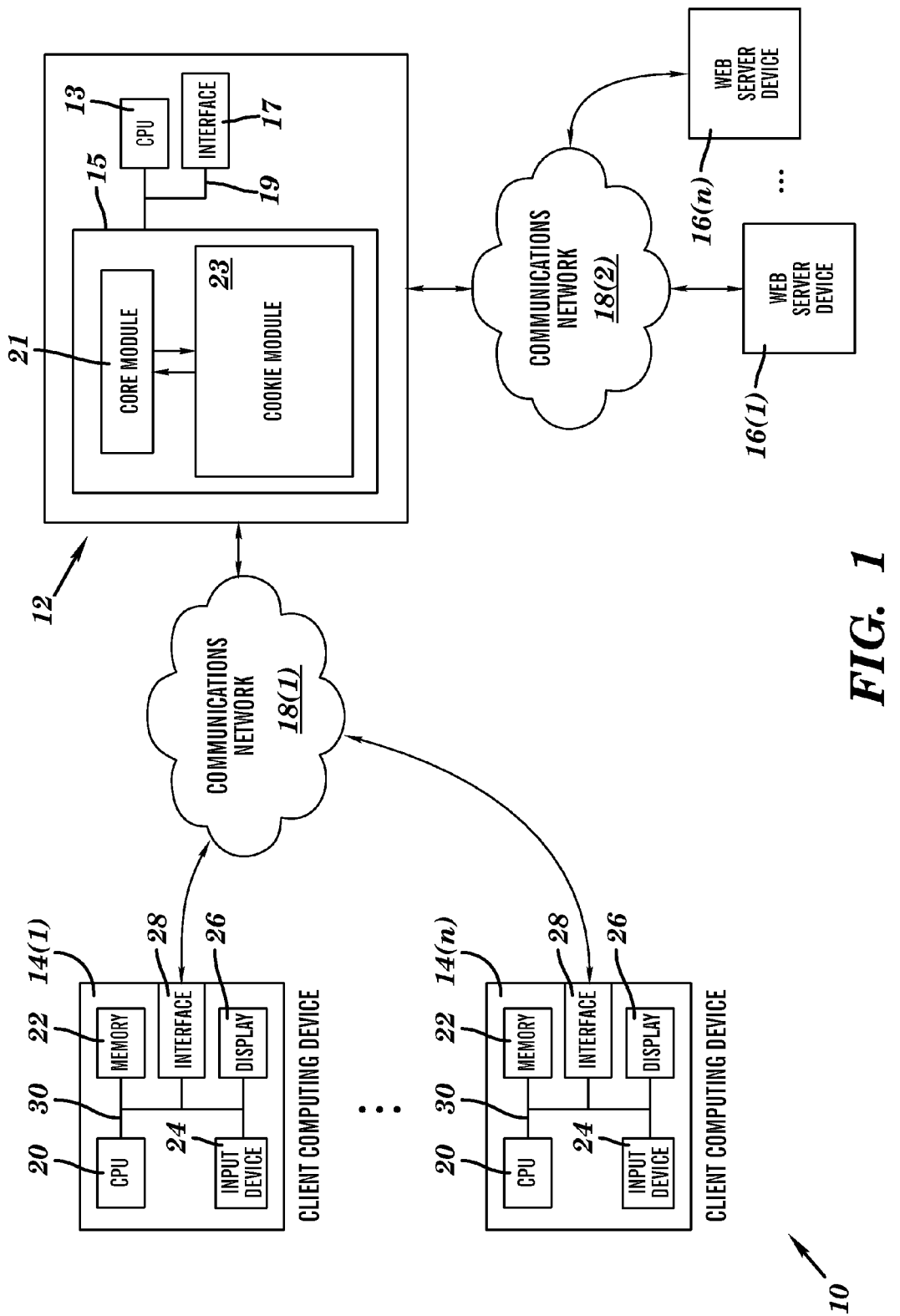

```
GET /A.html HTTP/1.1
Host: www.example.com
Accept: */*
User-Agent: my-mobile-browser 1.0
```

*FIG. 2A*

```
HTTP/1.1 200 OK
Content-Type: text/html; charset=UTF-8
Content-Length: 5300
Set-Cookie: SESSION=1234; domain=.example.com; path=/
```

*FIG. 2B*

```
HTTP/1.1 200 OK
Content-Type: text/html; charset=UTF-8
Content-Length: 5300
Set-Cookie: SESSION+.example.com+%252F=1234; path=/mt/
```

*FIG. 2C*

```
GET /mt/www.example.com/B.html HTTP/1.1
User-Agent: my-mobile-browser 1.0
Host: m.proxy.com
Accept: */*
Cookie: SESSION+.example.com+%252F=1234
```

*FIG. 2D*

```
GET /B.html HTTP/1.1
User-Agent: my-mobile-browser 1.0
Host: www.example.com
Accept: */*
Cookie: SESSION=1234
```

METHOD FOR OPTIMIZING A WEB CONTENT PROXY SERVER AND DEVICES THEREOF

This application is a continuation of U.S. patent application Ser. No. 12/660,637, filed on Mar. 2, 2010 which is hereby incorporated by reference in its entirety.

FIELD

This invention generally relates to proxy servers and, more particularly, methods for optimizing web content proxy servers and apparatuses thereof.

BACKGROUND

A web content optimization server is a proxy server that optimizes web pages obtained from remote web servers for client devices with special requirements, such as mobile phones, PDAs, and smartphones. Every time a client device requests a web page, the web content optimization server downloads the original page from a remote web server, applies some customized rules to extract relevant content, and adapts it to fit the needs of the requesting client device. By way of example, the web content optimization server may remove javascript, linearize content, and adapt the original page to a smaller screen layout for the requesting client device.

In computing, a cookie, such as a tracking cookie, browser cookie, and HTTP cookie, is a small piece of text stored by a web browser on the client device. A cookie includes one or more name-value pairs containing data, such as user preferences, shopping cart contents, the identifier for a server-based session, or other data used by websites.

Web content optimization servers need to save cookies to enable the client devices to interact with the original website at the remote web servers in the correct way. Accordingly, web content optimization servers store these cookies in an internal memory and associate them with the corresponding session from each client device so that when the same client device sends a request for a new page, the web content optimization server will load the matching cookies and send them to the remote web server to get the page to process. Unfortunately, storing the cookies for these client devices causes problems with scalability, security, and privacy of the web content optimization servers.

SUMMARY

A method for optimizing a web content proxy server includes obtaining at a proxy server a web page with an original server cookie from one of one or more web content servers in response to a request from one of one or more client devices. A web optimized client cookie based on the original server cookie is generated at the proxy server. The obtained web page with the generated web optimized client cookie is providing by the proxy server to the requesting one of one or more client devices.

A computer readable medium having stored thereon instructions for optimizing a proxy server comprising machine executable code which when executed by at least one processor, causes the processor to perform steps including obtaining a web page with an original server cookie from one or more web servers in response to a request from one of one or more client devices. A web optimized client cookie is generated based on the original server cookie and the obtained web page with the generated web optimized client cookie is transmitted to the requesting one of one or more client devices.

A web content proxy server or apparatus includes one or more processors and a memory coupled to the one or more processors which are configured to execute programmed instructions stored in the memory including obtaining a web page with an original server cookie from one or more web servers in response to a request from one of one or more client devices. A web optimized client cookie is generated based on the original server cookie and the obtained web page with the generated web optimized client cookie is transmitted to the requesting one of one or more client devices This technology provides a number of advantages including providing a method, computer readable medium and an apparatus that optimizes implementation of a web content proxy server for interactions involving cookies between client devices and remote web servers. With this technology, original server cookies are transformed by the web content proxy server to web optimized client cookies which are transmitted to the client devices requesting the web pages for storage and use with subsequent requests.

This technology provides greater scalability because the web optimized client cookies are stored in the web browser at the client device, not in memory at the web content proxy server. As a result, the web content proxy server does not face any issues with respect to memory storage capacity due to the number of sessions with cookies for client devices. The web content proxy server can use the same memory whether there are 100 or 1,000,000 or more client devices engaged in sessions with the remote web servers through the web content proxy server.

Additionally, this technology provides greater security and privacy because the web content proxy server does not contain a centralized database of original server cookies which contain session information from client devices browsing pages of web sites. Instead, these original server cookies are translated into web optimized client cookies which are then dispersed out among the client devices. As a result, the web content proxy server does not have any stored cookies from interactions between client devices and remote web servers that could be used to steal identity or other confidential information of these client devices.

BRIEF DESCRIPTION OF THE DRAWINGS

FIG. 1 is a block diagram of an exemplary environment with an optimized web content proxy server;

FIG. 2A is an example of a HTTP request for a web page from a remote web server;

FIG. 2B is an example of a HTTP response with an original server cookie from a remote web server to a HTTP request;

FIG. 2C is an example of a HTTP response containing the web optimized client cookie generated from the original server cookie received shown in FIG. 2B;

FIG. 2D is an example of another HTTP request with the web optimized client cookie shown in FIG. 2C for a web page from a remote web server.

FIG. 2E is an example of the another HTTP request with the web optimized client cookie shown in FIG. 2D translated into the original server cookie for transmission to the remote web server with the another get request;

DETAILED DESCRIPTION

Figure 3:
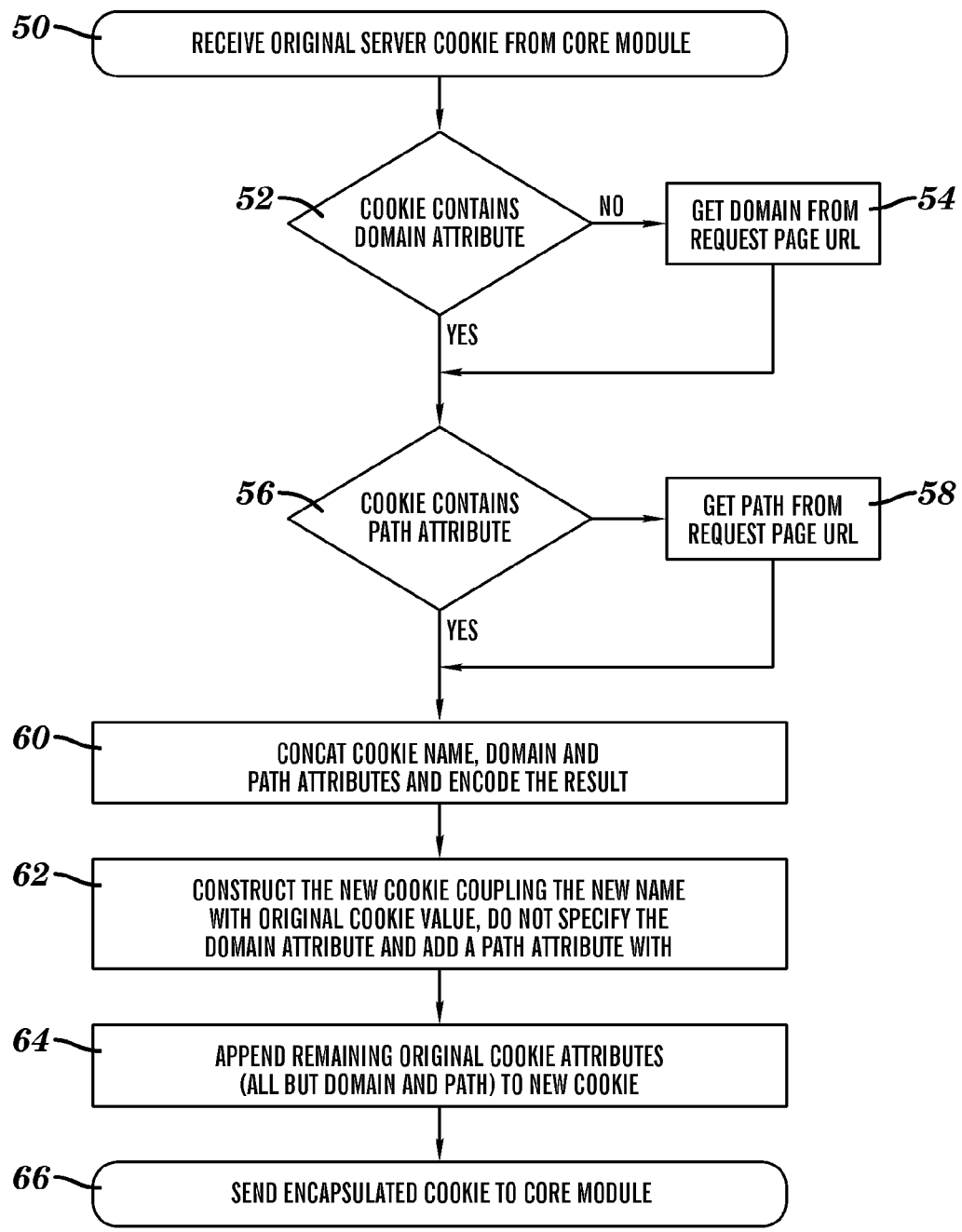
FIG. 3 is a flow chart of an example of a method for generating a web optimized client cookie from an original server cookie to optimize implementation of a web content proxy server.

An exemplary environment 10 in which a web content proxy server 12 is optimized is illustrated in FIG. 1. The exemplary environment 10 includes a web content proxy server or apparatus 12, client devices 14(1)-14(n), web server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium and an apparatus that optimizes implementation of a web content proxy server for interactions involving cookies between client devices and remote web servers.

Referring more specifically to FIG. 1, the web content proxy server 12 optimizes the handling of original server cookies from the web server devices 16(1)-16(n) for requesting client devices 14(1)-14(n) and the handling of web optimized client cookies, although the web content proxy server 12 can provide other numbers and types of functions. Although one web content proxy server 12 is shown, other numbers and types of web content proxy devices and systems can be used.

The web content proxy server 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the web content proxy server 12 executes a program of stored instructions one or more aspects of the present invention as described and illustrated by way of the embodiments herein, although the processor could execute other numbers and types of programmed instructions.

The memory 15 in the web content proxy server 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the web content proxy server 12. In these embodiments, the memory 15 includes a core module 21 and a cookie module 23 which store programmed instructions for one or more aspects of the present invention as described and illustrated herein, although the memory can comprise other types and numbers of systems, devices, and elements in other configurations which store other data. The cookie module 23 includes programmed instructions and/or logic configured to translate an original server cookie into a web optimized client cookie and to extract the original server cookie when a web optimized client cookie is received, although the cookie module 23 can have other types and numbers of functions as described and illustrated herein.

The interface system 17 in the web content proxy server 12 is used to operatively couple and communicate between the web content proxy server 12 and the client devices 14(1)-14(n) and the web server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used.

Each of the client devices 14(1)-14(n) enables a user to request, get and interact with web pages from one or more web sites hosted by the web server devices 16(1)-16(n) through the web content proxy server 12 via one or more communication networks, although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In this example, the client devices 14(1)-14(n) comprise mobile devices with Internet access that permit a website form page or other retrieved data to be displayed, although each of the client devices 14(1)-14(n). By way of example only, one or more of the client devices 14(1)-14(n) can comprise smart phones, personal digital assistants, or computers.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein as well as the web optimized client cookies, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n.

The user input device 24 in each of the client devices 14(1)-14(n) is used to input selections, such as requests for a particular website form page or to enter data in fields of a form page, although the user input device could be used to input other types of data and interact with other elements. The user input device can include keypads, touch screens, and/or vocal input processing systems although other types and numbers of user input devices can be used.

The display 26 in each of the client devices 14(1)-14(n) is used to show data and information to the user, such as website page by way of example only. The display in each of the client devices 14(1)-14(n) is a phone screen display, although other types and numbers of displays could be used depending on the particular type of client device.

The interface system 28 in each of the client devices 14(1)-14(n) is used to operatively couple and communicate between the client devices 14(1)-14(n) and the web content proxy server 12 and web server devices 16(1)-16(n) over the communication networks 18(1) and 18(2), although other types and numbers of communication networks with other types and numbers of connections and configurations can be used.

The web server devices 16(1)-16(n) provide one or more pages from one or more web sites for use by one or more of the client devices 14(1)-14(n) via the web content proxy server 12, although the web server devices 16(1)-16(n) can provide other numbers and types of applications and/or content and can have provide other numbers and types of functions. Although web server devices 16(1)-16(n) are shown for ease of illustration and discussion, other numbers and types of web server systems and devices can be used.

Each of the web server devices 16(1)-16(n) include a central processing unit (CPU) or processor, a memory, and an interface system which are coupled together by a bus or other link, although each of the web server devices 16(1)-16(n) could have other numbers and types of components, parts, devices, systems, and elements in other configurations and locations can be used. The processor in each of the web server devices 16(1)-16(n) executes a program of stored instructions one or more aspects of the present invention as described and illustrated by way of the embodiments herein, although the processor could execute other numbers and types of programmed instructions.

The memory in each of the web server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the web server devices 16(1)-16(n).

The interface system in each of the web server devices 16(1)-16(n) is used to operatively couple and communicate between the web server devices 16(1)-16(n) and the web content proxy server 12 and the client devices 14(1)-14(n) via communication networks 18(1) and 18(2), although other types and numbers of communication networks with other types and numbers of connections and configurations can be used.

Although embodiments of the web content proxy server 12, the client devices 14(1)-14(n), and the web server devices 16(1)-16(n), are described and illustrated herein, each of the client devices 14(1)-14(n), the web content proxy server 12, and the web server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

An exemplary method for generating a web optimized client cookie from an original server cookie to optimize implementation of the web content proxy server 12 will now be described with reference to FIGS. 1-2C and 3. In step 50, in this example one of the client devices 14(1)-14(n) via a web browser requests a page A.html at the website, "www.example.com" as shown in one example in FIG. 2A. This request is transmitted to the web content proxy server 12 which processes and transmits the request to the one of the web servers 16(1)-16(n) hosting the website "www.example.com." The hosting one of the web servers 16(1)-16(n) provides a response in this example for the requested page A.html which also contains an original server cookie "SESSION" to the web content proxy server 12 as shown in FIG. 2B. In this example, SESSION has a value equal to "1234", the domain is equal to ".example.com" and the path is equal to "/". This response uses the HTTP header Field "Set-Cookie". The cookie is a string formed by the pair "name=value", followed by optional attributes, like those in this example indicating the server domain(s) and path accepting this cookie. Although one illustrative example is described herein, this technology can be used with specifications for all cookies.

Next, in step 52 the web content proxy server 12 determines whether the original server cookie includes the domain attribute for the requested web page provided by the hosting one of the web servers 16(1)-16(n). If in step 52 the web content proxy server 12 determines the original server cookie does not include the domain attribute, then the No branch is taken to step 54. In step 54, the web content proxy server 12 extracts the domain attribute from the requested web page provided by the hosting one of the web servers 16(1)-16(n). If in step 52 the web content proxy server 12 determines the original server cookie does include the domain attribute, then the Yes branch is taken to step 56.

In step 56, the web content proxy server 12 determines whether the original server cookie includes the path attribute for the requested web page provided by the hosting one of the web servers 16(1)-16(n). If in step 52 the web content proxy server 12 determines the original server cookie does not include the path attribute, then the No branch is taken to step 58. In step 58, the web content proxy server 12 extracts the path attribute from the requested web page provided by the hosting one of the web servers 16(1)-16(n). If in step 56 the web content proxy server 12 determines the original server cookie does include the path attribute, then the Yes branch is taken to step 60.

Figure 4:
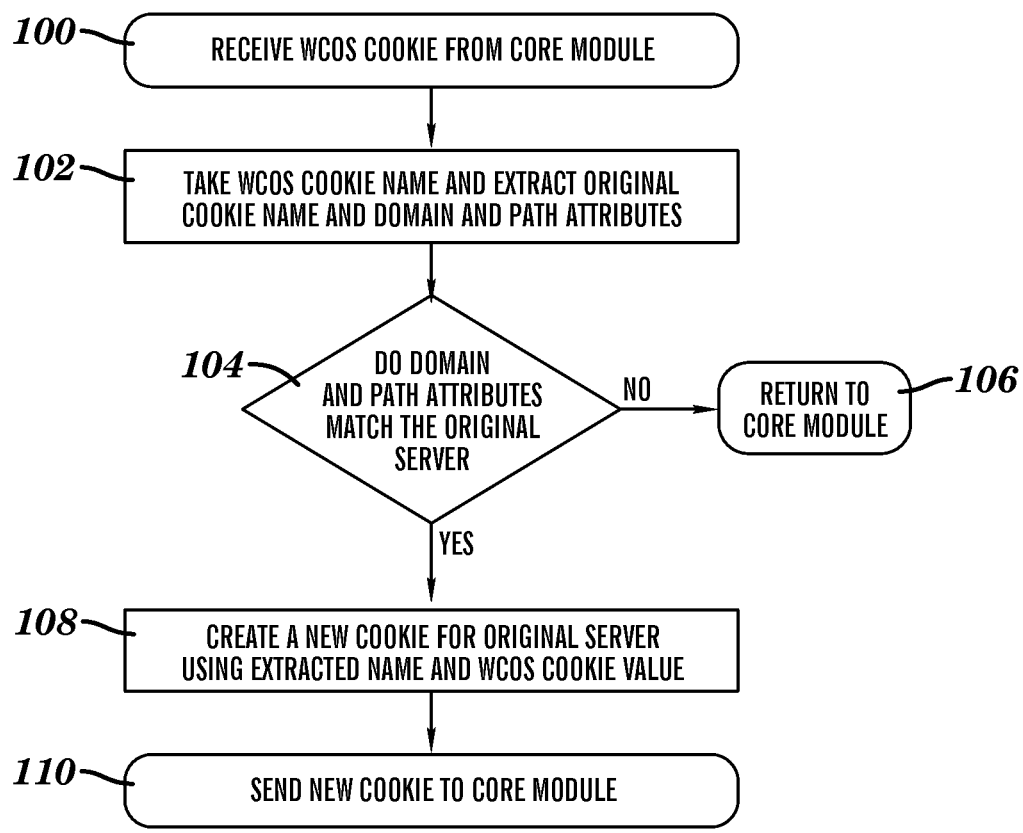
FIG. 4 is a flow chart of an example of a method for transforming a web optimized client cookie back to an original server cookie to optimize implementation of a web content proxy server.

In step 60, the web content proxy server 12 generates a name for the new web optimized client cookie by concatenating the original name with domain and path, separated by spaces, although other manners for generating the new name can be used. The resulting new name is "universal resource locator encoded" to keep conformance to the cookie specification. Additionally, the resulting new name is unique even if different domains contain cookies with the same name. This new name contains all the information necessary for the web content proxy server 12 to extract the original server cookie later as described in greater detail by reference to FIG. 4.

In step 62, the web content proxy server 12 forms the new web optimized client cookie by associating the new name with the same value of the original server cookie, with the domain attribute not being specified, and with the path attribute being associated with a value "/", although other values can be used, such as one for the path attribute that corresponds to a prefix associated with this optimization method (by way of example only "/mt/").

By way of example only, when the web content proxy server 12 receives a response with the original server cookie as shown in FIG. 2B, the web content proxy server 12 generates a web optimized client cookie as shown in FIG. 2C. More specifically, the original server cookie: SESSION=1234; domain=.example.com; and path=/is transformed by the web content proxy server 12 to a web optimized client cookie: SESSION+.example.com+%252F=1234; path=/mt/. Accordingly, in this illustrative example the new web optimized client cookie name SESSION+.example.com+%252F is the encoded version of the concatenation of original server cookie name, domain attribute and path attribute, although other orders and manners for forming this name can be used. In this example, the new path attribute corresponds to a prefix "/mt/" associated with this optimization method.

Next, in step 64 the web content proxy server 12 copies the remaining attributes in the original server cookie, such as an expiration date for the original server cookie by way of example, in the web optimized client cookie, although other amounts of the remaining attributes could be copied and other information also could be added.

Next, in step 66 the original server cookie which has been translated into the web optimized client cookie is now provided to the core module 21 in the web content proxy server 12. The core module 21 includes programmed instructions and/or logic to manage the transmission of the web optimized client cookie from the web content proxy server 12 to the requesting one of the client devices 14(1)-14(n). The web browser at the requesting one of the client devices 14(1)-14(n) receives and saves the web optimized client cookie in the memory 22 at the requesting one of the client devices 14(1)-14(n). In this illustrative example, the web optimized client cookie shown in FIG. 2C is stored in the memory 22 at the requesting one of the client devices 14(1)-14(n).

Referring now to FIGS. 1, 2D-2E and 4, an exemplary method for translating a web optimized client cookie back to an original server cookie to optimize the implementation of the web content proxy server 12 will now be described. In step 100, in this example one of the client devices 14(1)-14(n) via a web browser submits another request to the web content proxy server 12 for page B.html at the website, "www.example.com" as shown in one example in FIG. 2D. This request includes a web optimized client cookie which in this example comprises SESSION+.example.com+%252F.

In step 102, the web content proxy server 12 extracts the original server cookie name and the domain and path attributes from the name of the web optimized client cookie. In this illustrative example, the original server cookie name and the domain and path attributes are extracted by the web content proxy server from the name: SESSION+.example.com+%252F.

In step 104, the web content proxy server 12 determines whether the extracted domain and path attributes identify a web optimized client cookie that is a match to universal resource locator for the requested web page. If in step 104 the web content proxy server 12 determines the extracted domain and path attributes identify a web optimized client cookie is not a match, then the No branch is taken to step 106. In step 106, the web content proxy server 12 submits the request to the hosting one of the web servers 16(1)-16(n) hosting the request page without an original server cookie. In this illustrative example, the requested page is "B.html." If in step 104 the web content proxy server 12 determines the extracted domain and path attributes identify a web optimized client cookie is a match, then the Yes branch is taken to step 108.

In step 108, the web content proxy server 12 associates the extracted name from the web optimized client cookie with the value for the original server cookie. The extracted name and value comprise the original server cookie which is appended to the HTTP cookie header fields of the request to be sent to the one of the web servers 16(1)-16(n) hosting the requested web page. In this illustrative example, the extracted name SESSION is associated with the value 1234.

In step 110, the web content proxy server 12 submits the request with the reconstituted original server cookie to the one of the web servers 16(1)-16(n) hosting the requested page. In this illustrative example, the request with the reconstituted original server cookie as shown in FIG. 2E is transmitted to the one of the web servers 16(1)-16(n) hosting the requested page.

Accordingly, as illustrated and described herein this technology provides a number of advantages including providing a method, computer readable medium and an apparatus that optimizes implementation of a web content proxy server for interactions involving cookies between client devices and remote web servers. With this technology, the web content proxy server is much more scalable because of the reduced memory storage demands. Additionally, with this technology the web content proxy server poses a much lower security and privacy risk to information provided by the client devices 14(1)-14(n).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for optimizing a proxy server, the method comprising:

obtaining at a proxy server content with an original server cookie from a content server in response to a request from a client device for the content;

generating at the proxy server an optimized client cookie comprising a name, the name comprising at least a name of the original server cookie and at least a portion of a domain and a path associated with the obtained content;

providing with the proxy server the obtained content and the generated optimized client cookie to the requesting client device; and processing with the proxy server a subsequent request from the client device by reconstituting the original server cookie using the optimized client cookie included in the subsequent request.

2. The method as set forth in claim 1, wherein the processing further comprises:

determining whether the reconstituted original server cookie corresponds with a network address of the subsequent request; and providing the subsequent request with the reconstituted original server cookie to the content server when it is determined that the reconstituted original server cookie corresponds with the network address of the subsequent request.

3. The method as set forth in claim 1, wherein the generating further comprises:

concatenating the name of the original server cookie and the at least a portion of the domain and the path associated with the obtained content to form the name of the optimized client cookie; and associating the name of the optimized client cookie with a value of the original server cookie.

4. The method as set forth in claim 1, wherein the providing further comprises providing the obtained content and the generated optimized client cookie to the requesting client device without storing the original server cookie or the web optimized client cookie in a memory of the proxy server.

5. The method as set forth in claim 1, wherein the generating further comprises appending one or more original attributes of the original server cookie to the optimized client cookie.

6. The method as set forth in claim 1, wherein the generating further comprises:

determining whether the original server cookie includes a domain attribute;

generating the name of the optimized client cookie using a domain of a network address of the obtained content when it is determined that the original server cookie does not include a domain attribute;

generating the name of the optimized client cookie using the domain attribute of the original server cookie when it is determined that the original server cookie includes a domain attribute;

determining whether the original server cookie includes a path attribute;

generating the name of the optimized client cookie using a path of a network address of the obtained content when it is determined that the original server cookie does not include a path attribute; and generating the name of the optimized client cookie using the path attribute of the original server cookie when it is determined that the original server cookie includes a path attribute.

7. The method as set forth in claim 6, wherein the domain and path attributes correspond to a network address of the requested content.

8. A non-transitory computer readable medium having stored thereon instructions for optimizing a proxy server comprising machine executable code which when executed by at least one processor, causes the processor to perform steps comprising:

obtaining content with an original server cookie from a content server in response to a request from a client device for the content;

generating an optimized client cookie comprising a name, the name comprising at least a name of the original server cookie and at least a portion of a domain and a path associated with the obtained content;

providing the obtained content and the generated optimized client cookie to the requesting client device; and processing a subsequent request from the client device by reconstituting the original server cookie using the optimized client cookie included in the subsequent request.

9. The medium as set forth in claim 8, wherein the processing further comprises:

determining whether the reconstituted original server cookie corresponds with a network address of the subsequent request; and providing the subsequent request with the reconstituted original server cookie to the content server when it is determined that the reconstituted original server cookie corresponds with the network address of the subsequent request.

10. The medium as set forth in claim 8, wherein the generating further comprises:

concatenating the name of the original server cookie and the at least a portion of the domain and the path associated with the obtained content to form the name of the optimized client cookie; and associating the name of the optimized client cookie with a value of the original server cookie.

11. The medium as set forth in claim 8, wherein the providing further comprises providing the obtained content and the generated optimized client cookie to the requesting client device without storing the original server cookie or the web optimized client cookie in a local memory.

12. The medium as set forth in claim 8, wherein the generating further comprises appending one or more original attributes of the original server cookie to the optimized client cookie.

13. The medium as set forth in claim 8, wherein the generating further comprises:

determining whether the original server cookie includes a domain attribute;

generating the name of the optimized client cookie using a domain of a network address of the obtained content when it is determined that the original server cookie does not include a domain attribute;

generating the name of the optimized client cookie using the domain attribute of the original server cookie when it is determined that the original server cookie includes a domain attribute;

determining whether the original server cookie includes a path attribute;

generating the name of the optimized client cookie using a path of a network address of the obtained content when it is determined that the original server cookie does not include a path attribute; and generating the name of the optimized client cookie using the path attribute of the original server cookie when it is determined that the original server cookie includes a path attribute.

14. The medium as set forth in claim 13, wherein the domain and path attributes correspond to a network address of the requested content.

15. A proxy server apparatus, comprising:
one or more processors; and
a memory coupled to the one or more processors which are configured to execute programmed instructions stored in the memory comprising:
  obtaining content with an original server cookie from a content server in response to a request from a client device for the content;
  generating at the proxy server an optimized client cookie comprising a name, the name comprising at least a name of the original server cookie and at least a portion of a domain and a path associated with the obtained content;
  providing the obtained content and the generated optimized client cookie to the requesting client device; and
  processing a subsequent request from the client device by reconstituting the original server cookie using the optimized client cookie included in the subsequent request.

16. The apparatus as set forth in claim 15, wherein the processing further comprises:
  determining whether the reconstituted original server cookie corresponds with a network address of the subsequent request; and
  providing the subsequent request with the reconstituted original server cookie to the content server when it is determined that the reconstituted original server cookie corresponds with the network address of the subsequent request.

17. The apparatus as set forth in claim 15, wherein the generating further comprises:
  concatenating the name of the original server cookie and the at least a portion of the domain and the path associated with the obtained content to form the name of the optimized client cookie; and
  associating the name of the optimized client cookie with a value of the original server cookie.

18. The apparatus as set forth in claim 15, wherein the providing further comprises providing the obtained content and the generated optimized client cookie to the requesting client device without storing the original server cookie or the web optimized client cookie in the memory.

19. The apparatus as set forth in claim 15, wherein the generating further comprises appending one or more original attributes of the original server cookie to the optimized client cookie.

20. The apparatus as set forth in claim 15, wherein the generating further comprises:
  determining whether the original server cookie includes a domain attribute;
  generating the name of the optimized client cookie using a domain of a network address of the obtained content when it is determined that the original server cookie does not include a domain attribute;
  generating the name of the optimized client cookie using the domain attribute of the original server cookie when it is determined that the original server cookie includes a domain attribute;
  determining whether the original server cookie includes a path attribute;
  generating the name of the optimized client cookie using a path of a network address of the obtained content when it is determined that the original server cookie does not include a path attribute; and
  generating the name of the optimized client cookie using the path attribute of the original server cookie when it is determined that the original server cookie includes a path attribute.

21. The apparatus as set forth in claim 20, wherein the domain and path attributes correspond to a network address of the requested content.

* * * * *